United States Patent [19]

Lippmann et al.

[11] Patent Number: 5,014,051
[45] Date of Patent: May 7, 1991

[54] INCREASED RESOLUTION SENSOR CIRCUIT

[75] Inventors: Raymond Lippmann, Ann Arbor; Michael J. Schnars, Clarkston; James R. Chintyan, Davison, all of Mich.

[73] Assignee: Delco Electronics Corporation, Kokomo, Ind.

[21] Appl. No.: 457,061

[22] Filed: Dec. 26, 1989

[51] Int. Cl.$^5$ .................. G08C 19/00; G08C 15/00; G01F 23/36

[52] U.S. Cl. .................. 340/870.38; 340/825.78; 340/644; 73/313

[58] Field of Search .......... 340/870.38, 644, 825.78, 340/825.72; 364/482, 483; 324/691, 713; 73/313; 200/1 R; 341/24, 26, 32

[56] References Cited

U.S. PATENT DOCUMENTS

| | | | |
|---|---|---|---|
| 2,843,839 | 7/1958 | Cunningham | 340/825.74 |
| 2,999,227 | 9/1961 | Hezel et al. | 340/825.77 |
| 3,443,438 | 2/1967 | Martin et al. | 340/644 |
| 4,006,637 | 2/1977 | Kinosita | 73/313 |
| 4,227,057 | 10/1980 | Kubler | 73/313 |
| 4,227,236 | 10/1980 | Kubler | 73/313 |
| 4,560,986 | 12/1985 | Lew et al. | 73/313 |
| 4,627,283 | 12/1986 | Nishida et al. | 73/313 |
| 4,695,840 | 9/1987 | Darilek | 340/870.38 |
| 4,699,003 | 10/1987 | Harde | 73/313 |
| 4,730,491 | 3/1988 | Lew | 73/313 |
| 4,796,472 | 1/1989 | Lew | 340/870.38 |

Primary Examiner—Sandra L. O'Shea
Assistant Examiner—Brian Zimmerman
Attorney, Agent, or Firm—Mark A. Navarre

[57] ABSTRACT

An improved sender circuit which provides increased resolution measurements from a sensor by using two or more separately applied driving voltages. Only two connections to the sensor are required, the sensor having one or more switches closed in relation to the parameter being measured.

14 Claims, 2 Drawing Sheets

INCREASED RESOLUTION SENSOR CIRCUIT

This invention relates to a circuit for obtaining increased resolution measurements of a parameter using a switch-array sensor.

BACKGROUND OF THE INVENTION

A switch array can be used as a sensor to measure a parameter. In implementing the switch array as a measuring device, the array is designed so that the electrical state of the switches are altered in relation to the measurement of the parameter. To limit the number of connection terminals to the array, resistors may be connected between the switches so that, with the individual closing of each switch, the array circuit has a different impedance. With this arrangement, the array can be used with just two connecting terminals. One problem with this arrangement, however, is that the resolution of the sensor is limited by the number of switches in the array.

One known way to increase sensor resolution is to allow more than one switch to be closed at certain times, and take the impedance measurements of two circuits created by the state of the switches. This approach, however, requires three or more connections to the sensor.

Another method of increasing the resolution of the sensor is increasing the number of switches and resistors in the array. This, however, increases the cost of the sensor. Because of the above limitations, switch array sensors are often discarded in favor of other types of sensors.

SUMMARY OF THE PRESENT INVENTION

The present invention is directed to an improved sender circuit which requires only two connections to the sensor, but also allows for increased resolution measurements of the parameter. The sensor used has one or two switches closed in relation to a parameter being measured. The circuit of the invention applies two or more voltages to the sensor, at least one above a predetermined threshold, and at least one below the predetermined threshold. While these voltages are being applied, the impedance of the sensor is measured. The impedances measured when the voltage above the threshold is applied are used to determine which switch closest to one end of the array is closed. The impedances measured when the voltage below the threshold is applied are used to determine which switch closest to the other end of the array is closed.

For every possible state of the switch array (one specific switch or two specific adjacent switches being closed), the combination of the impedance measurements above and below the threshold will be unique. It follows that for a sensor with an array of five individual switches, where one switch or two consecutive switches are continuously closed, nine unique switching combinations exist, each combination with a unique set of output impedances. Using previous methods, without increasing the number of connections, only five unique measurements were available for an array with five switches. With the present invention, because of the increased number of combinations, higher resolution measurements can be made with only two connections to the sensor.

DETAILED DESCRIPTION OF THE DRAWINGS

Figure 1A:
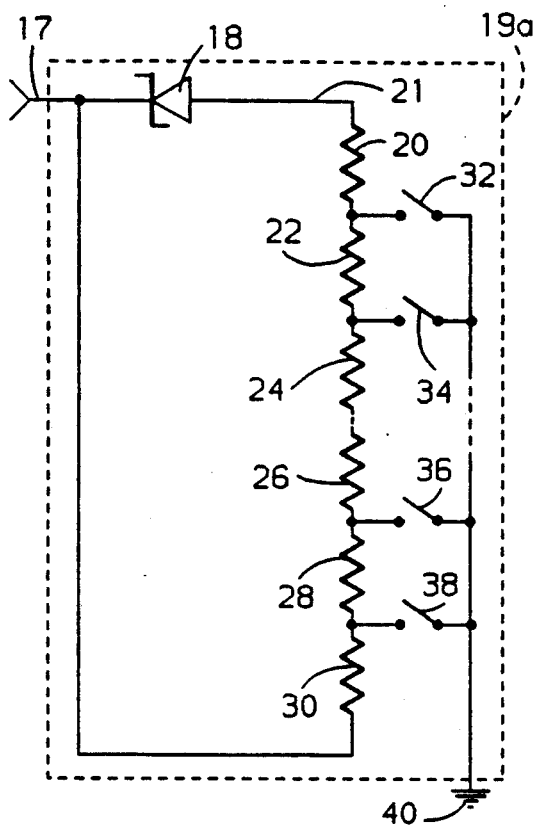
FIGS. 1(a) and 1(b) are circuit drawings illustrating two implementations of the sensor circuit.
Figure 1B:
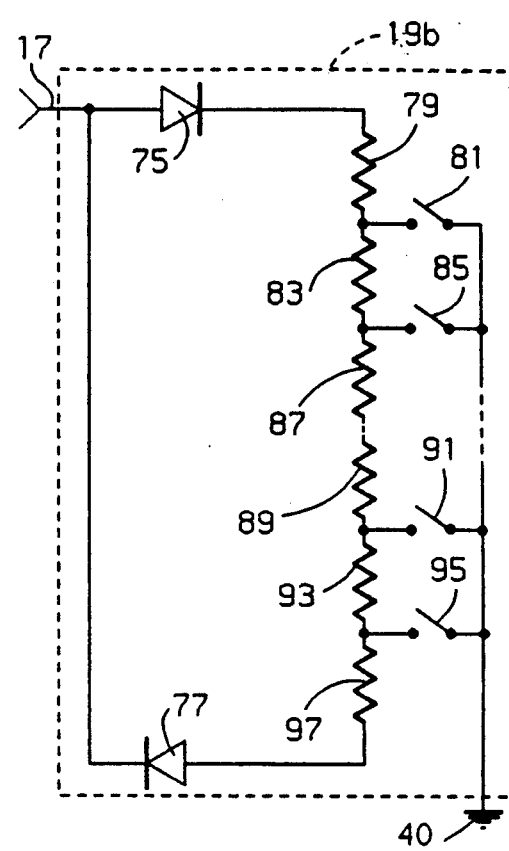

FIGS. 1(a) and 1(b) show two possible circuit drawings of the sensor assembly. The sensor assembly contains a serial array of switches (32, 34, 36, 38 in FIG. 1(a) and 81, 85, 91, 95 in FIG. 1(b)), such as magnetic reed switches. The states of the switches are controlled by a tripping mechanism, such as a magnetic float, that travels between the ends of the switch array in relation to a parameter being measured. The tripping mechanism closes either one switch or two consecutive switches in the array at any one point in time. As shown in FIGS. 1(a) and 1(b) the switches are connected at one end to a common line, and at the other end to intermediate points in a series of resistors (20, 22, 24, 26, 28, 30 in FIG. 1(a), and 79, 83, 87, 89, 93, and 97 in FIG. 1(b)). These resistors are not necessarily the same values. One skilled in the art can easily optimize the values for best performance as the application requires.

Figure 2:
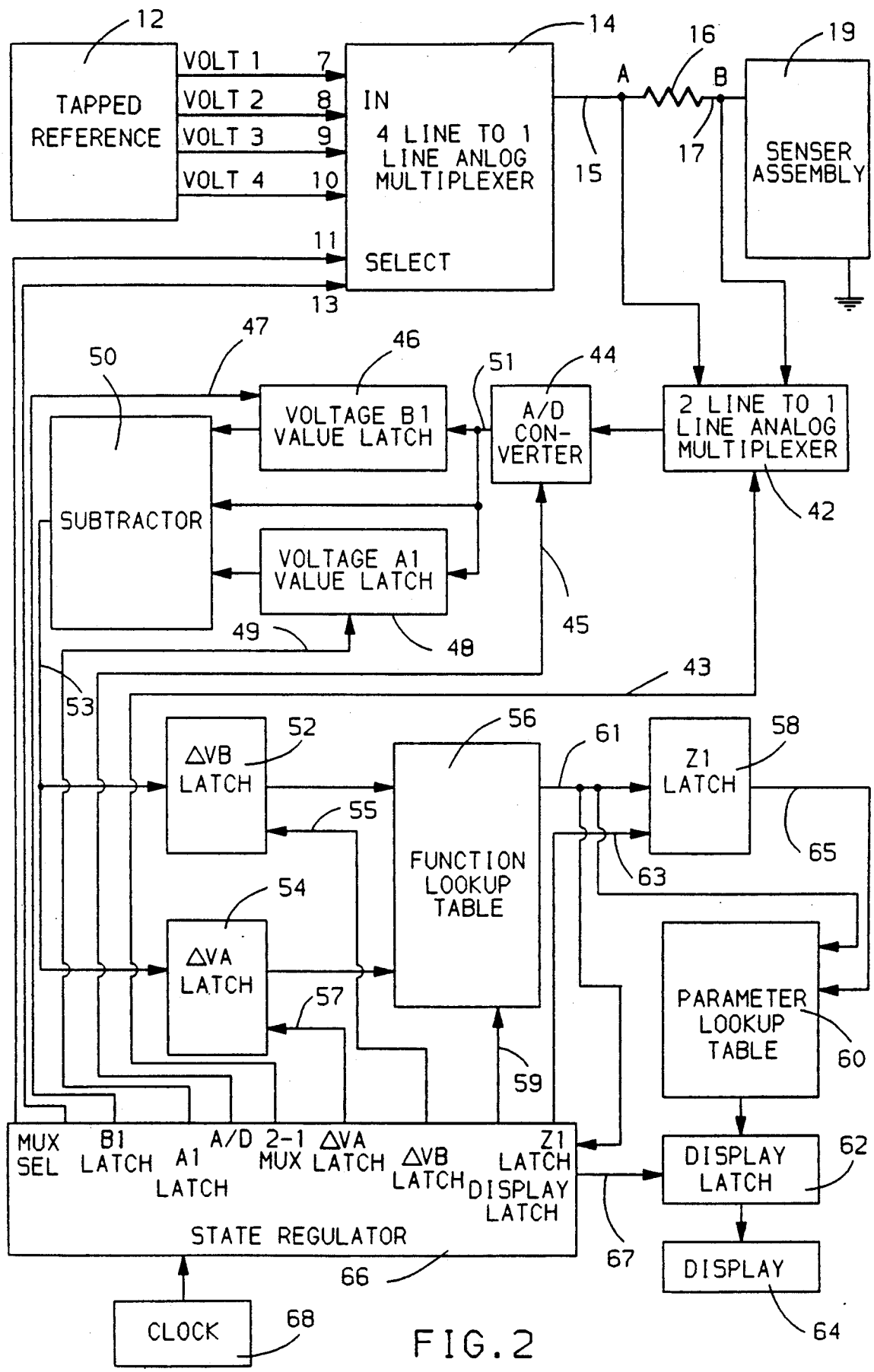
FIG. 2 is a circuit diagram of one implementation of a circuit for driving the sensor circuit. The figure shows the circuit which supplies voltages above and below the threshold, takes voltage and current measurements, computes the measure of the parameter, and displays the computed measurement.

FIG. 2 shows a driving circuit which can be connected to the circuit in FIG. 1(a), and with slight modification, can be connected to the circuit in FIG. 1(b). For purposes of clarity, some of the boxes in FIG. 2 will be explained first, then the general operation of the illustrated embodiments will be explained.

The tapped reference 12 can be implemented with four series combinations of zener diodes and resistors connected between a positive voltage supply and ground. The zener voltages of the diodes match the tapped reference voltages and regulate the voltages 1–4. For the implementation utilizing the sensor assembly in FIG. 1(a), exemplary voltages are: voltage 1=2 volts, voltage 2=3 volts, voltage 3=8 volts, and voltage 4=9 volts. For the implementation utilizing the sensor assembly in FIG. 1(b), there would have to be a positive and a negative voltage supply (or the ground reference would have to be moved up above voltage 1 and voltage 2) to utilize the signal diodes, and exemplary voltages are: voltage 1=−9 volts, voltage 2=−6 volts, voltage 3=+6 volts and voltage 4=+9 volts.

The state regulator 66 can be built a number of different ways, but the most straight forward implementation would be a counter and a Read-Only-Memory (ROM), with the counter resetting to zero for every cycle. The clock 68 increments the counter output with every pulse, and the counter output is used as an address for the ROM. The data stored in the ROM at each address corresponds to the data needed to drive each of the control lines at the time that address is accessed. One bit of memory corresponds to each control line 11, 13, 43, 45, 47, 49, 55, 57, 59, 63, and 67. The counter is reset when line 61 indicates an invalid conversion has occurred due to noise, or invalid switch signals. For this application the memory may be two 27512 EPROM's and the clock 68 a Motorola K-1158AM Crystal Oscillator. The latches, 46, 48, 52, 54, 58, and 62, may all be 74HC373 latches. The function lookup table 56 is a 27512 EPROM preprogrammed with the solutions to the function specified below. The 4-line to 1-line multiplexer 14 and the 2-line to 1-line multiplexer 42 are each one half of a DG509A analog multiplexer. The A/D converter 44 may be an ADC674. The rest of the components in the circuit are relatively straight forward and could be easily implemented by one skilled in the art without further description herein.

The circuit applies four different voltages to the sensor assembly 19 to determine the measure of the parameter. The circuit uses two voltages above the threshold voltage of the sensor 19 and two voltages below the threshold voltage of the sensor 19 to determine the state of the sensor 19, and the measure of the parameter. By using the ratio of the change of current over the change of voltage for two sets of measurements above the threshold and two sets of measurements below the threshold, error in the measurements of voltages and currents caused by the signals passing through Multiplexer 42, the A/D converter 44, or variations in the zener voltage of diode 18 and reference 12 (FIG. 1(a)), can be eliminated. Because of the resistor 16, the circuit in FIG. 2 does not measure current directly. Instead the circuit measures the voltage on each side of the resistor. The ratio of the change in current over the change in voltage can still be determined using the following function:

$$delta-I/delta-V = (1/R)(((delta-VA)/(delta-VB))-1)$$

where delta−I equals the change in current through the sensor, delta−V equals the change in voltage across the sensor, R equals the value of resistor 16, delta−VA equals the change of voltage in line 15, and delta−VB equals the change in voltage in line 17. The solutions to this function are programmed into the ROM serving as the function lookup table 56.

The clock 68 controls the frequency of the circuit through the state regulator 66. The state regulator 66 controls which voltage is applied to the sensor assembly 19 through the select lines 11 and 13. The tapped reference unit 12 supplies the four reference voltages through lines 7, 8, 9 and 10. The reference voltage lines 7, 8, 9 and 10 are connected to the 4 to 1 multiplexer 14 and, based on the state of the select lines 11 and 13 which control the multiplexer 14, one of the reference voltages from lines 7, 8, 9 or 10 appears on line 15. The state regulator 66 controls the select lines 11 and 13 so that line 15 carries a sequence of voltages, 2 volts, 3 volts, 8 volts and 9 volts (if the sensor assembly 19a in FIG. 1(a) is used), then the series repeats. Line 15 is connected to one end of the resistor 16. At the other end of the resistor 16, line 17 supplies the voltage to the sensor assembly 19, one version shown in FIG. 1(a) and another version shown in FIG. 1(b).

Both sensor assemblies shown draw current as a function of the input voltage and the state of the switches in the arrays. For the sensor 19a shown in FIG. 1(a), the first two voltages of the sequence (2 V and 3 V) are both below the zener voltage of zener diode 18. The zener voltage here serves as the threshold voltage of the sensor assembly 19a. Since the 2 volts and 3 volts are both below the zener voltage, no current flows through the zener diode 18 when these two voltages are applied at line 15. The current flows through resistor 30, and up through the other resistors in the series array until it comes to a closed switch, which provides a direct circuit path to ground. The signal at reference point A (referred to below as voltage A) is equal to the voltage on line 15 and, because of resistor 16, the signal at reference point B (referred to below as voltage B), line 17, depends on the current drawn by the sensor assembly 19a. When the voltage applied to the sensor assembly 19a is less than the threshold voltage of zener diode 18, the signal in line 17 is a function of the voltage applied to line 15 and which sensor switch closest to ground 40 is closed.

The next two voltages that are applied to the sensor assembly 19a, 8 V and 9 V, are both greater than the threshold voltage of zener diode 18. When these voltages are applied to the sensor assembly, current flows through two paths, the first path including the zener diode 18 and resistor 20, and the second path including resistor 30. The current flows through each of these paths and the series of resistors in each path until it comes to a closed switch which provides a direct path to ground. As above, the signal at point A is equal to the voltage on line 15 and, because of the resistor 16, the signal on line 17 depends on the current drawn by the sensor assembly 19a. When the voltage applied to the sensor assembly 19a is greater than the threshold voltage of the zener diode 18, the signal in line 17 is a function of the voltage applied to line 15, which sensor switch closest to the ground 40 is closed, and which sensor switch closest to the zener diode 18 is closed.

The voltage values on lines 15 and 17 are fed into the 2-line to 1-line multiplexer 42. The multiplexer 42 is controlled by the state regulator through select line 43. The output of the multiplexer 42 is supplied to the input of the A/D converter 44, which is controlled by the state regulator through line 45. The output of the A/D converter 44 is connected, through line 51, to the voltage B1 value latch 46, the voltage A1 value latch 48, and the subtractor 50. When the value of the first voltage B appears on line 51, it is latched into the voltage B1 value latch 46, which is controlled by the state regulator 66 through control line 47. When the value of the first voltage A appears on line 51, it is latched into the voltage A1 value latch 48, which is controlled by the state regulator 66 through control line 49. The outputs of the voltage B1 value latch 46 and the voltage A1 value latch 48 are connected to the subtractor 50. When the value of the second voltage B appears on line 51, the subtractor 50 subtracts the value of the first voltage B, latched in the output of the voltage B1 value latch 46, from the value of the second voltage B. The subtractor 50 outputs the signal representing the difference between the value of the second voltage B and the value of the first voltage B in line 53. This signal in line 53 gets latched in the delta−VB latch 52, which is controlled by the state regulator 66 through line 55.

When the value of the second voltage A appears on line 51, the subtractor 50 subtracts the value of the first voltage A which is latched into the output of the voltage A1 value latch 48 from the value of the second voltage A. The subtractor 50 outputs the signal representing the difference between the value of the second voltage A and the value of the first voltage A in line 53. This signal in line 53 gets latched into the delta−VA latch 54, which is controlled by the state regulator 66 through line 57. The outputs of the delta−VB latch 52 and delta−VA latch 54 are connected to the input of the function lookup table 56.

The state regulator 66 controls the function lookup table 56 through line 59. The function lookup table 56 performs the following function on the inputs:

$$(1/R)(((delta-VA)/(delta-VB))-1)$$

where R is the value of the resistor 16. The function lookup table 56 supplies the result on line 61. Line 61 is connected to the input of the Z1 latch 58, to state regulator 66 as the disable update line, and also to the parameter lookup table 60. The Z1 latch 58 is controlled by the state regulator 66 through line 63. The Z1 latch 58 latches in the function lookup table result for voltage 1 and voltage 2 and supplies this value to the parameter lookup table 60 through line 65.

When the value of the third voltage B appears on line 51, it is latched into the voltage B1 value latch 46. When the value of the third voltage A appears on line 51, it is latched into the voltage A1 value latch 48. When the value of the fourth voltage B appears on line 51, the subtractor 50 subtracts the value of the third voltage B, latched in the output of the voltage B1 value latch 46, from the value of the fourth voltage B. The subtractor 50 outputs the difference in line 53. This signal in line 53 gets latched in the delta−VB latch 52. When the value of the fourth voltage A appears on line 51, the subtractor 50 subtracts the value of the third voltage A which is latched into the output of the voltage A1 value latch 48 from the value of the fourth voltage A. The subtractor 50 outputs the difference in line 53. This signal in line 53 gets latched in the delta−VA latch 54. The outputs of the delta−VB latch 52 and delta−VA latch 54 are connected to the input of the function lookup table 56. The function lookup table 56 performs the following mathematical function on the inputs:

$$(1/R)(((delta-VA)/(delta-VB))-1)$$

where R is the value of the resistor 16. The function lookup table supplies the result on line 61.

The value of the function lookup table output for voltages 3 and 4 on line 61, and the value of the function lookup table output for voltages 1 and 2 on line 65 are used together as an address input to the parameter lookup table 60. The combination of these values is unique for every switch combination in the sender assembly. For each combination, the corresponding measure of the parameter is programmed into the ROM at the specified address. The contents of the specific address being accessed are sent to the display latch 62. The display latch 62 is controlled by the state regulator 66 through line 67 and provides the signal used to drive the display 64. However, if the signal on line 61 indicates to the state regulator that the switch array is in a state of all switches being open, the state regulator resets the counter, restarting the cycle, so the display will not be updated until valid data is received. A condition of all switches being open could come from a broken switch or an in between state in the switch array.

Figure 3:
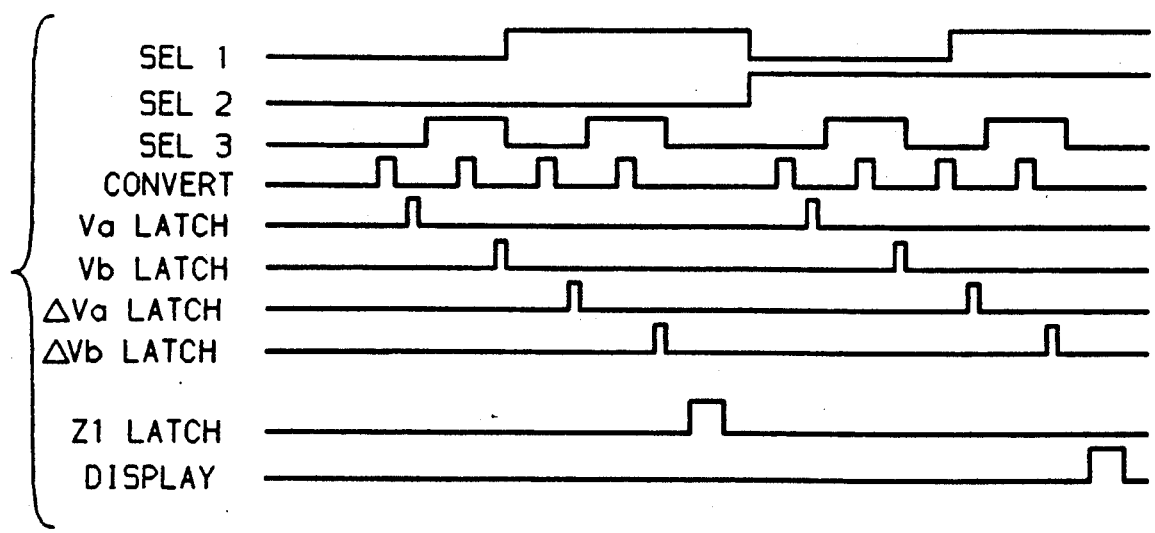
FIG. 3 is a timing diagram that shows the relationships of certain line voltages for the circuit in FIG. 2.

FIG. 3 is a timing diagram of the state of each of the control lines of state regulator 66 during one entire cycle of the circuit. From this diagram, the state regulator can easily be programmed by one skilled in the art.

For the implementation utilizing the sensor assembly 19b of FIG. 1(b), the first two voltages of the sequence, −9 volts and −6 volts are both below the ground reference which serves as the threshold voltage of the sensor assembly. Since the −9 volts and −6 volts are both below ground, no current flows through the diode 75 when these two voltages are applied at line 17. The current flows through diode 77, from resistor 97, down from the other resistors in the series starting at the first closed switch, which provides a direct circuit path from ground. The resistor 16 provides a signal in line 17 representing the amount of current drawn by the sensor assembly. When the voltage applied to the sensor assembly is less than ground, the signal in line 17 is a function of the voltage in line 15 and which sensor switch closest to resistor 97 is closed.

The next two voltages that are applied to the sensor assembly, +6 volts and +9 volts, are both greater than ground. When these voltages are applied to the sensor assembly, current flows through diode 75, resistor 79, and on down through the series of resistors until it comes to a closed switch, which provides a direct circuit path to ground. As above, the resistor 16 provides a signal in line 17 representing the amount of current drawn by the sensor assembly 19b. When the voltage applied to the sensor assembly 19b is greater than ground, the signal in line 17 is a function of the voltage in line 15 and which sensor switch closest to resistor 79 is closed. The rest of the circuit functions in the same general manner as identified above in relation to the embodiment of FIG. 1(a).

Another implementation of the invention utilizes an AC voltage source to drive the sensor. The output of the AC voltage source is connected directly to line 15. In this case, the state regulator controls the 2-line to 1-line multiplexer 42 to latch in and send the values on lines 15 and 17 to the A/D converter 44 at the times when the value of the AC source on line 15 corresponds to the predetermined voltage values 1–4, rendering the control lines 11 and 13 unnecessary. The cycle of the state regulator must be timed to match the cycle of the AC voltage source. The remainder of the circuit operates as identified above.

The above-described embodiments provide increased resolution measurements from a switch array sensor without increasing the number of switches. While described in reference to the illustrated embodiments, the circuit of this invention does not need to appear as shown above. Moreover, various other modifications may occur to those skilled in the art, and circuits incorporating those modifications may fall within the scope of this invention which is defined in the claims below.

The embodiments of the invention in which an exclusive property or privilege is claimed are defined as follows:

1. A circuit for determining high resolution upon a serial array of switching mechanisms, the switching mechanisms having open and closed states, each being connected at one end to a common line and at the other end to intermediate points in a series of resistors, the array having first and second ends, the circuit comprising:

means for referencing the array to a threshold voltage;

first measurement means for applying a voltage above the threshold to the array and referencing means, and measuring a first output signal from the array and referencing means to determine which switching mechanism closest to the first end of the array is closed;

second measurement means for applying a voltage below the threshold to the array and referencing means, and measuring a second output signal from the array and referencing means to determine which switching mechanism closest to the second end of the array is closed; and relational means for determining a measure of the parameter based on the first and second output signals.

2. The circuit set forth in claim 1, wherein the voltages above and below the threshold voltage are supplied by an AC voltage source.

3. A circuit for determining high resolution measurement of a parameter having a state altering affect upon a serial array of switching mechanisms, the switching mechanisms having open and closed states, each being connected at one end to a common line and at the other end to intermediate points in a series of resistors, the array having first and second ends, the circuit comprising:

means for referencing the array to a threshold voltage, including first and second diodes connected together and to the first and second ends of the array so that when voltage above the threshold is applied, current flows from the connection of the first and second diodes to the first end of the array and, when voltage below the threshold is applied, current flows from the second end of the array to the connection of the first and second diodes;

first measurement means for applying a voltage above a threshold to the array and referencing means, and measuring a first output signal from the array and referencing means to determine which switching mechanism closest to the first end of the array is closed, the first measurement means including a first voltage source for supplying a voltage above the threshold voltage to the array; and second measurement means for applying a voltage below the threshold to the array and referencing means, and measuring a second output signal from the array and referencing means to determine which switching mechanism closest to the second end of the array is closed, the second measurement means including a second voltage source for supplying a voltage to the array below the threshold voltage, wherein the first and second voltage sources are connected to the circuit through a switch, and are intermittently switched into the circuit.

4. A circuit for determining high resolution measurement of a parameter having a state altering affect upon a serial array of switching mechanisms, the switching mechanisms having open and closed states, each being connected at one end to a common line and at the other end to intermediate points in a series of resistor, the array having first and second ends, the circuit comprising:

means for referencing the array to a threshold voltage, the referencing means including first and second diodes connected together and to the first and second ends of the array so that when voltage above the threshold is applied, current flows from the connection of the first and second diodes to the first end of the array and, when voltage below the threshold is applied, current flows from the second end of the array to the connection of the first and second diodes;

first measurement means for applying a voltage above the threshold to the array and referencing means, and measuring a first output signal from the array and referencing means to determine which switching mechanism closest to the first end of the array is closed;

second measurement means for applying a voltage below the threshold to the array and referencing means, and measuring a second output signal from the array and referencing means to determine which switching mechanism closest to the second end of the array is closed, wherein the first and second measurement means include an AC voltage source, the AC voltage source supplying a voltage having components above and below the threshold voltage; and relational means for determining a measure of the parameter based on the first and second output signals.

5. A circuit for determining high resolution measurement of a parameter having a state altering affect upon a serial array of switching mechanisms having open and closed states, the switching mechanisms each being connected at one end to a common line and at the other end to intermediate points in said array, the array having first and second ends, the circuit comprising:

a zener diode having a zener threshold voltage connected to the first end of the array oriented to prevent current from traveling through the zener diode and into the array when a voltage below the zener voltage is applied across the diode and the array;

first measurement means for applying a voltage above the zener threshold voltage to the circuit and detecting a first output signal from the circuit to determine which switching mechanism closest to the first end of the array is closed;

second measurement means for applying a second voltage below the zener threshold voltage to the circuit and detecting a second output signal from the circuit to determine which switching mechanism closest to the second end of the array is closed; and relational means for determining a measure of the parameter based on the first and second output signals.

6. The circuit set forth in claim 5, wherein the source of the first voltage and the source of the second voltage are connected to the circuit through a switch, and the first and second voltages are intermittently switched into the circuit.

7. The circuit set forth in claim 5, wherein the source of the first and second voltages is an AC voltage source supplying voltage having components above and below the zener threshold voltage.

8. A circuit for determining high resolution measurements of a parameter, the circuit containing an array of switching mechanisms, each having a closed state and an open state, each normally in the open state, each connected at one end to a common line and at the other end to intermediate points in a series of resistors, the measure of the parameter having a relational affect upon the array of switching mechanisms, the relational affect being a tripping device operating to continuously close either one or two of the switching mechanisms, the array having a first end and a second end, the circuit comprising:

means for referencing the array to a threshold voltage;

first measurement means for applying a voltage above the threshold to the array and referencing means, and measuring a first output signal from the array second measurement means for applying a voltage below the threshold to the array and referencing means, and measuring a second output signal from the array and referencing means to determine which switching mechanism closest to the second end of the array is closed; and relational means for making a determining measure of the parameter based on the first and second output signals.

9. The apparatus set forth in claim 8, wherein the voltages above and below the threshold voltage are supplied by an AC voltage source.

10. The apparatus set forth in claim 8, wherein the switching mechanisms are magnetically activated reed switches and the tripping device includes a magnet that moves along the array in relation to the parameter to be measured.

11. The apparatus set forth in claim 8, wherein:

the referencing means includes first and second diodes connected together and to the first and second ends of the array so that when voltage above the threshold is applied, current flows from the connection of the first and second diodes to the first end of the array and, when voltage below the threshold is applied, current flows from the second end of the array to the connection of the first and second diodes;

the first measurement means includes a first voltage source supplying a voltage to the array above the threshold level;

the second measurement means includes a second voltage source supplying a voltage to the array below the threshold level; and the first and second voltage sources are connected to the circuit through a switch, and are intermittently switched into the circuit.

12. A circuit for determining high resolution measurements of a parameter, the circuit containing an array of switching mechanisms, each having a closed state and an open state, each normally in the open state, each connected at one end to a common line and at the other end to intermediate points in a series of resistors, the measure of the parameter having a relational affect upon the array of switching mechanisms, the relational affect being a tripping device operating to continuously close either one or two of the switching mechanisms, the array having first and second ends, the circuit comprising:

a zener diode having a zener threshold voltage connected to the first end of the array oriented to prevent current from traveling through the zener diode and into the array when a voltage below the zener voltage is applied across the diode and the array;

a first measurement means for applying a voltage above the zener threshold voltage to the circuit and detecting a first output signal from the circuit to determine which switching mechanism closest to the first end of the array is closed;

a second measurement means for applying a source of a second voltage below the zener threshold voltage to the circuit and detecting a second output signal from the circuit to determine which switching mechanism closest to the second end of the array is closed; and a relational means for determining a measure of the parameter based on the first and second output signals.

13. The apparatus set forth in claim 12, wherein the source of the first voltage and the source of the second voltage are connected to the circuit through a switch, and the first and second voltages are intermittently switched into the circuit.

14. The apparatus set forth in claim 12, wherein the source of the first and second voltages is an AC voltage source supplying voltage having components above and below the zener threshold voltage.

* * * * *